US005601524A

United States Patent [19]

Knelson

[11] Patent Number: 5,601,524

[45] Date of Patent: Feb. 11, 1997

[54] METHOD OF SEPARATING INTERMIXED MATERIALS OF DIFFERENT SPECIFIC GRAVITY WITH SUBSTANTIALLY INTERMIXED DISCHARGE OF FINES

[76] Inventor: Benjamin Knelson, 20321-86th Avenue, Vancouver, British Columbia, Canada, V3A 6Y3

[21] Appl. No.: 511,478

[22] Filed: Aug. 4, 1995

[51] Int. Cl.$^6$ .............................. B01D 43/00; B04B 11/04

[52] U.S. Cl. .............................. 494/29; 494/37; 494/56; 494/80

[58] Field of Search .............................. 494/2, 27–30, 494/37, 43, 56, 63, 65, 80; 210/380.1, 781

[56] References Cited

U.S. PATENT DOCUMENTS

| | | | |
|---|---|---|---|
| 957,478 | 5/1910 | Simpson | 494/56 |
| 1,283,846 | 11/1918 | Mark et al. . | |
| 1,473,421 | 11/1923 | Eccleston . | |
| 1,557,672 | 10/1925 | Doerner . | |
| 1,594,501 | 8/1926 | Eccleston . | |
| 1,718,547 | 6/1929 | Eccleston | 494/29 |
| 2,688,437 | 9/1954 | Monnet . | |
| 3,152,074 | 10/1964 | Fontein et al. . | |
| 3,823,869 | 7/1974 | Loison | 494/56 |
| 4,432,748 | 2/1984 | Novoselac et al. | 494/2 |
| 4,608,040 | 8/1986 | Knelson | 494/27 |
| 4,846,781 | 7/1989 | Knelson | 494/27 |
| 4,981,219 | 1/1991 | Burnell et al. | 494/27 X |
| 5,338,284 | 8/1994 | Knelson . | |
| 5,368,541 | 11/1994 | Knelson | 494/37 |

FOREIGN PATENT DOCUMENTS

| | | | |
|---|---|---|---|
| 22055/35 | 4/1936 | Australia | 494/27 |
| 2133722 | 8/1984 | United Kingdom | 494/56 |
| WO93/13864 | 7/1993 | WIPO . | |

*Primary Examiner*—Charles E. Cooley

*Attorney, Agent, or Firm*—Adrian D. Battison; Murray E. Thrift

[57] ABSTRACT

A centrifugal separator for separating heavy metals from lighter ore includes a bowl rotatable about its axis and defining annular collection areas on the peripheral surface of the bowl at axially spaced positions along the bowl. At the peripheral wall in each area is provided a plurality of angularly spaced discharge openings which are controlled by pinch valves to periodically allow the radial escape of the collected material. The pinch valves of a first area are controlled at different timing to the pinch valves of a second area to vary the concentration of the materials collected in the different areas. The pinch valves are operated by a pressurized liquid system which is fed to the different areas through a swivel coupling mounted at a longitudinal shaft supporting the bowl.

14 Claims, 9 Drawing Sheets

METHOD OF SEPARATING INTERMIXED MATERIALS OF DIFFERENT SPECIFIC GRAVITY WITH SUBSTANTIALLY INTERMIXED DISCHARGE OF FINES

BACKGROUND OF THE INVENTION

This invention relates to an apparatus and method for separating intermixed materials of different specific gravity and in particular an arrangement employing a rotating bowl having discharge ports in the bowl allowing heavier materials collecting in the bowl to discharge outwardly of the bowl under centrifugal action for collection.

One example of an arrangement of this type is shown in U.S. Pat. No. 5,338,284 of the present inventor which discloses a centrifuge bowl having a peripheral wall with the bowl being rotated about a longitudinal axis so that the peripheral wall rotates about the axis and causes centrifugal force at the peripheral wall to effect separation of materials passing over the peripheral wall. The arrangement provides a plurality of axially arranged collection areas each of which has a plurality of angularly spaced discharge ports so that the materials collecting in the collection areas are discharged outwardly from the bowl for collection. Pinch valves control the discharge.

Another arrangement is shown in International application WO93/13864 by McAlister.

SUMMARY OF THE INVENTION

It is one object of the present invention to provide improvements in the above arrangement of the present inventor to enable an enhancement of the efficiency of separation.

The invention therefore provides a centrifugal separator having a bowl with a peripheral wall. At two axially spaced positions on the peripheral wall are defined collection areas for collecting heavier particulate materials from a slurry flowing over the peripheral wall to the open mouth. Each collection area includes a radially extending annular recess of the peripheral wall into which the heavier material collects. The heavier material is discharged outwardly of the peripheral wall under centrifugal forces. The material is discharged through a series of angularly spaced discharge ports which are controlled by pinch valves located outwardly of the bowl. The valves of the second or downstream recess are controlled separately from those of the first recess to provide different separation characteristics.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
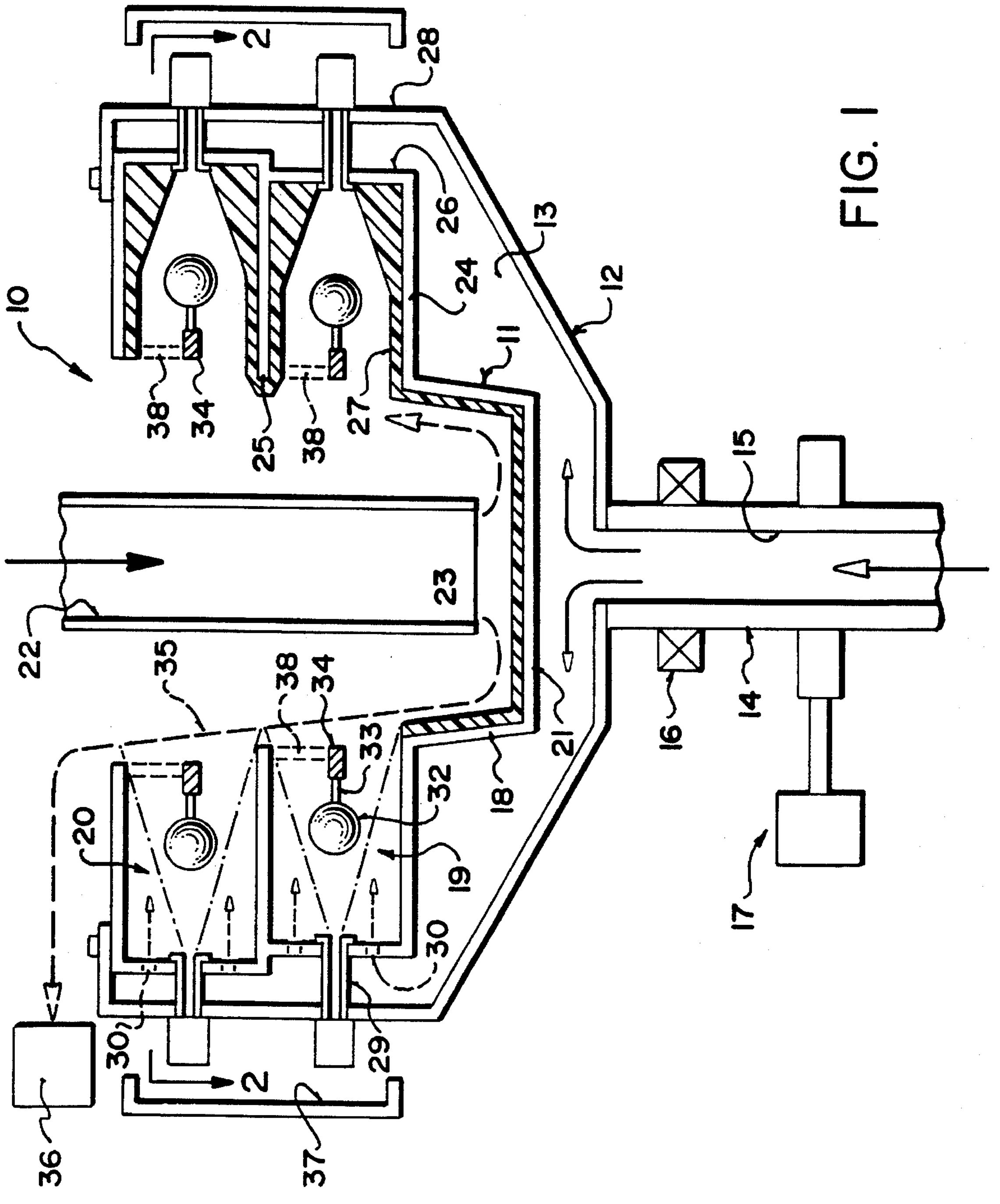
FIG. 1 is a vertical cross sectional view showing schematically a first embodiment of centrifugal separator according to the present invention.
Figure 2:
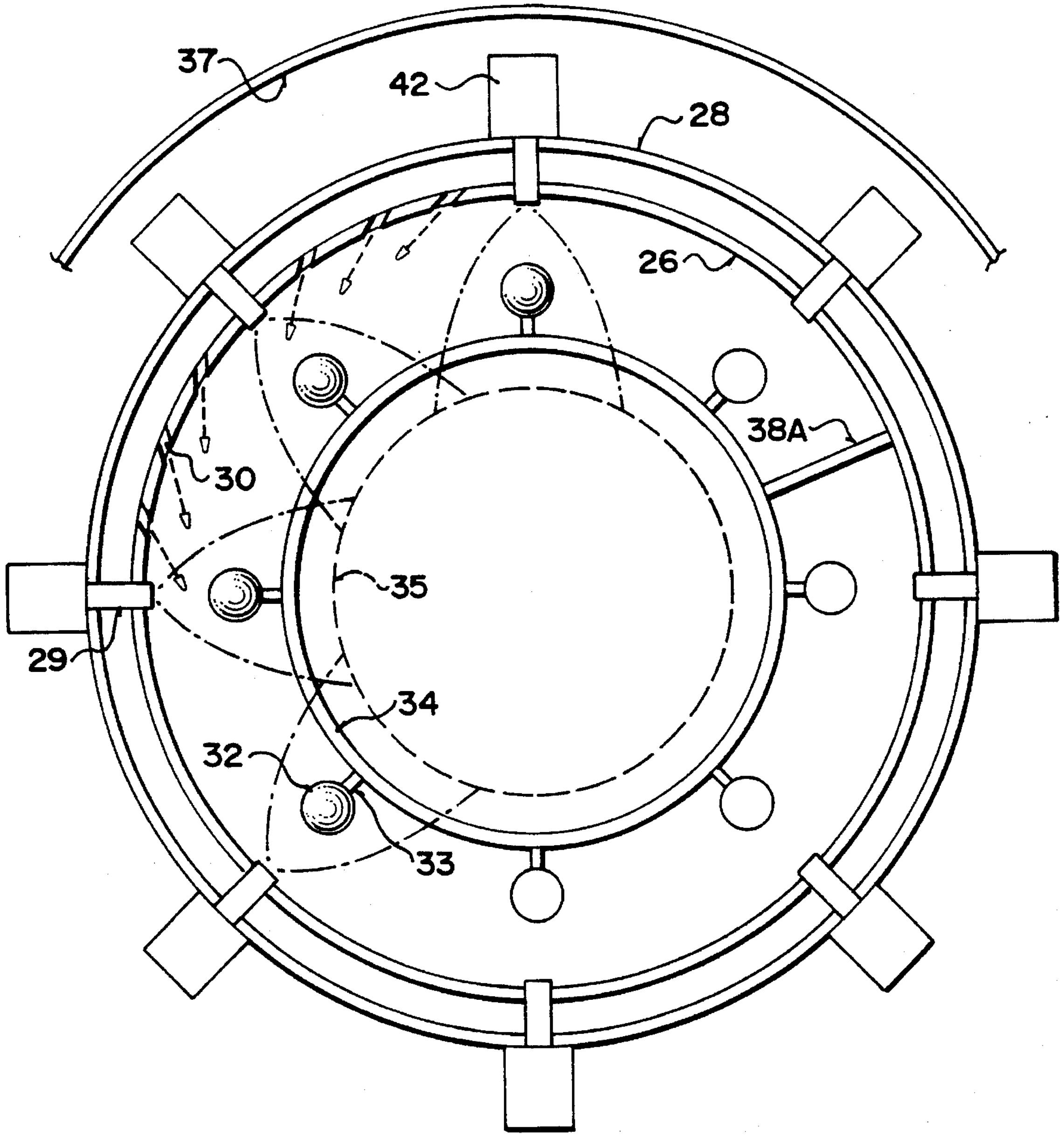
FIG. 2 is a cross sectional view along the lines 2—2 of FIG. 1.

The embodiment shown in FIGS. 1 and 2 is modified relative to the above mentioned U.S. Pat. No. 5,338,284 of the present inventor which shows a centrifugal separator having a plurality of rings defining therebetween recesses with each recess having a plurality of angularly spaced discharge nozzles. Each discharge nozzle is controlled by a pinch valve. The material discharged from the pinch valves is collected.

The arrangement of the present invention as shown in FIGS. 1 and 2 is a modification of the above construction and reference should be made to the above patent for further details of the elements shown schematically in the drawings herein.

In FIGS. 1 and 2, therefore, the apparatus comprises a centrifuge bowl generally indicated at 10 including an inner bowl wall 11 and an outer housing 12 defining therebetween a space 13 for fluidization water supplied through a hollow drive shaft 14 in a duct 15 within the shaft. The drive shaft is connected to the bowl for co-rotation of the inner bowl and the outer housing with the shaft. The shaft is mounted on bearings 16 and is driven by a drive system generally indicated at 17.

The inner bowl is shaped to define a frusto conical base portion 18, a first annular recess 19 and a second annular recess 20. This shape is therefore modified relative to the previous arrangement in that there are only two recesses and the base portion includes the frustoconical wall extending from a flat base 21 onto which the feed materials are discharged by a feed duct 22. The materials thus are spread outwardly by engagement with the flat base 21 and engage onto the frustoconical wall 18 so as to turn and move up the wall of the bowl. The base and frustoconical wall are covered by a liner layer 23. The liner layer 23 also engages into the recesses 19 and 20. The recesses 19 and 20 are each of generally rectangular cross section as shown in FIG. 1 but the liner material is shaped so that it becomes thicker toward a base of the recess thus shaping the recess into a generally V shape.

The bowl in the area of the recesses is formed by two annular discs 24 and 25 connected by a cylindrical base wall 26. The liner material indicated at 27 follows the side walls 25 and 24 part way through their depth and then increases in thickness to form the V shape. The liner material extends around the full periphery of the recess but is shown only on one side for convenience of illustration. The base walls 26 of the recesses are spaced from a cylindrical wall 28 of the outer housing so as to provide a space therebetween into which the fluidizing liquid or water can penetrate for injection through the base wall 26 into the interior of the recess.

The base 26 of each recess therefore has a number of discharge ports 29 at angularly spaced positions around the recess as best shown in FIG. 2. These discharge ports are of the general shape shown in the above patent except that the ports do not include injection openings for injection of water into the recess. The ports comprise simply discharge ports with a longitudinal duct which diverges in shape as previously described with a pinch valve at the outer end for controlling the amount of material discharged.

The base also includes a plurality of fluid injection openings 30 which allow the injection of fluidizing water from the supply outside the inner bowl. As shown in FIG. 2, the injection openings are arranged to be inclined relative to a radius of the bowl so as to tend to inject the liquid tangentially around the bowl to effect the fluidizing action on the materials in the recess.

The recesses are modified relative to the above prior patent in that the depth of the recess is significantly increased and in addition a flow guide body 32 is provided in association with each of the discharge ports 29. Each flow guide body is positioned radially inwardly of the respective discharge port so as to see the location spaced inwardly from the port but lying within the recess. Various shapes of guide body can be used in the arrangement the guide body is spherical. Each guide body supported by a support arm 33 extending radially inwardly from the guide body. The support arms are coupled to a ring 34 positioned centrally of the recess that is halfway between the walls 24 and 25 and others in diameter substantially equal to an inside edge of each of the wall 24, 25. The ring 34 thus in effect divides each recess into two separate recesses at the mouth of the recess but the recess is of course open radially outwardly of the ring except for those areas at which the spherical guide body 32 and its support arm are located.

The separation of the materials therefore occurs generally at the mouth of the recesses and between the walls 24, 25 and the ring 34. The separation occurs at an inner surface of the material indicated at 35 in which the heavier materials collect into the recesses between the wall 24 and 25 and either side of the ring 34. The lighter material pass over the collection area defined by the recesses and over the open mouth of the bowl to a collection system schematically indicated at 36. The heavier materials collects within each of the recesses for movement outwardly through the discharge ports 29 for collection of the heavier materials within a collection system schematically indicated at 37.

The ring 34 is supported in the bowl by a longitudinal support strut 38 which connects the ring to one or both of the walls 24, 25. The ring is thus supported in position and of course rotates with the bowl carrying with it the support arms 33 and the guide bodies 32.

The position of the guide bodies immediately forward of the discharge ports acts to support the material radially inward of the guide body to prevent that material from pressing radially outwardly on the discharge port due to the high centrifugal force. It will be appreciated, in the absence of the guide bodies, all the centrifugal force on the material will press the material against the discharge port providing a very high force at that location. The guide body takes away some of that force and transfers the force to the ring 34 while the material can slip around the guide body.

The discharge zone of each discharge port is therefore generally conical with an apex at the discharge port at an axis of the cone extending radially inwardly of the bowl. The cone thus diverges outwardly around the guide body with the angle of the cone being dependent upon the slippage of the material which is related to its repose angle. In addition the material is fluidized by injection of the water through the openings 30 tending to prevent the high centrifugal force on the material from drying the material and thus forming an immovable wedge of material in front of the discharge port.

The depth of the recess is however modified relative to the previous arrangement in that as shown in FIG. 2 the cone of the discharge zone in front of each discharge port diverges so that the cones intersect at the inner surface 35 of the material. In addition the cone is arranged as shown in FIG. 1 so that the cone of the discharge zone extends to a position adjacent the walls 24 and 25. The discharge zone therefore defines a pattern on the inner surface 35 which is substantially circular with those circular discharge patterns overlapping so as to draw material from substantially the whole of the inner surface wherein that the surface overlies the recesses. The separation of the material at the inner surface therefore provides a layer of the heavier material on the inner surface which is then collected and discharged gradually outwardly as the material is discharged from the discharge ports 29.

In one example, therefore, the height of each recess is of the order of 4 inches and the depth of the recesses is of the order of 6 inches and these dimensions are arranged so that they provide approximately the arrangement of the discharge zone as shown.

The shaping of the liner to substantially follow the shape of the discharge cone as shown on the right hand side of FIG. 1 assist in avoiding stationary material being located within the recesses. However the fluidization of the material in the recess by the injection openings 30 provides a gradual migration of the material around the recess to enter the discharge zone of each discharge port. However the main effect of the discharge ports is to collect the material from the inner surface 35 and to gradually move that material outwardly to the discharge port. The guide body 32 assists in increasing the angle of the discharge cone so as to increase the dimension of the discharge pattern at the inner surface.

Figure 3:
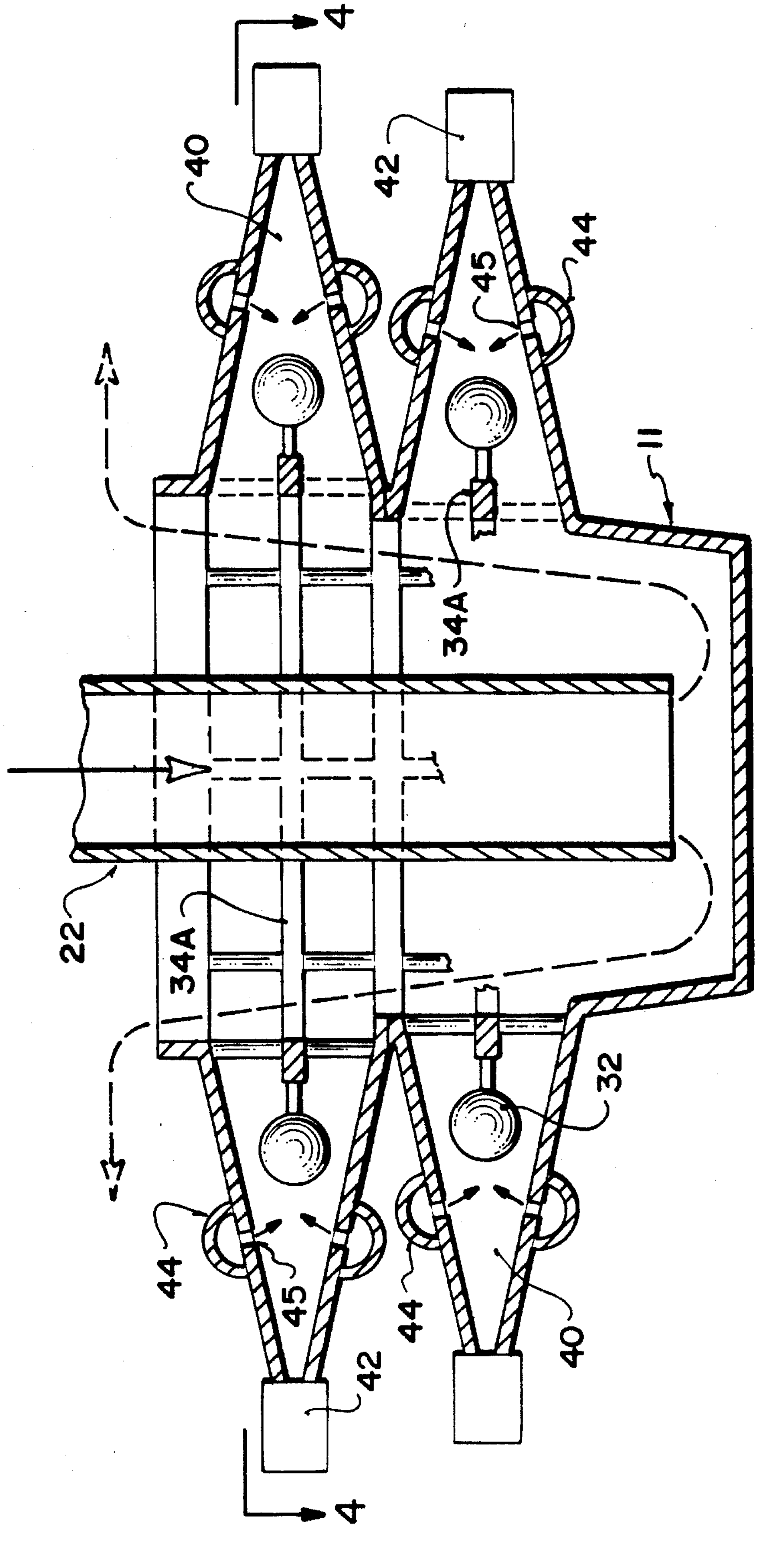
FIG. 3 is a vertical cross sectional view through a second embodiment of centrifugal separator according to the present invention.
Figure 4:
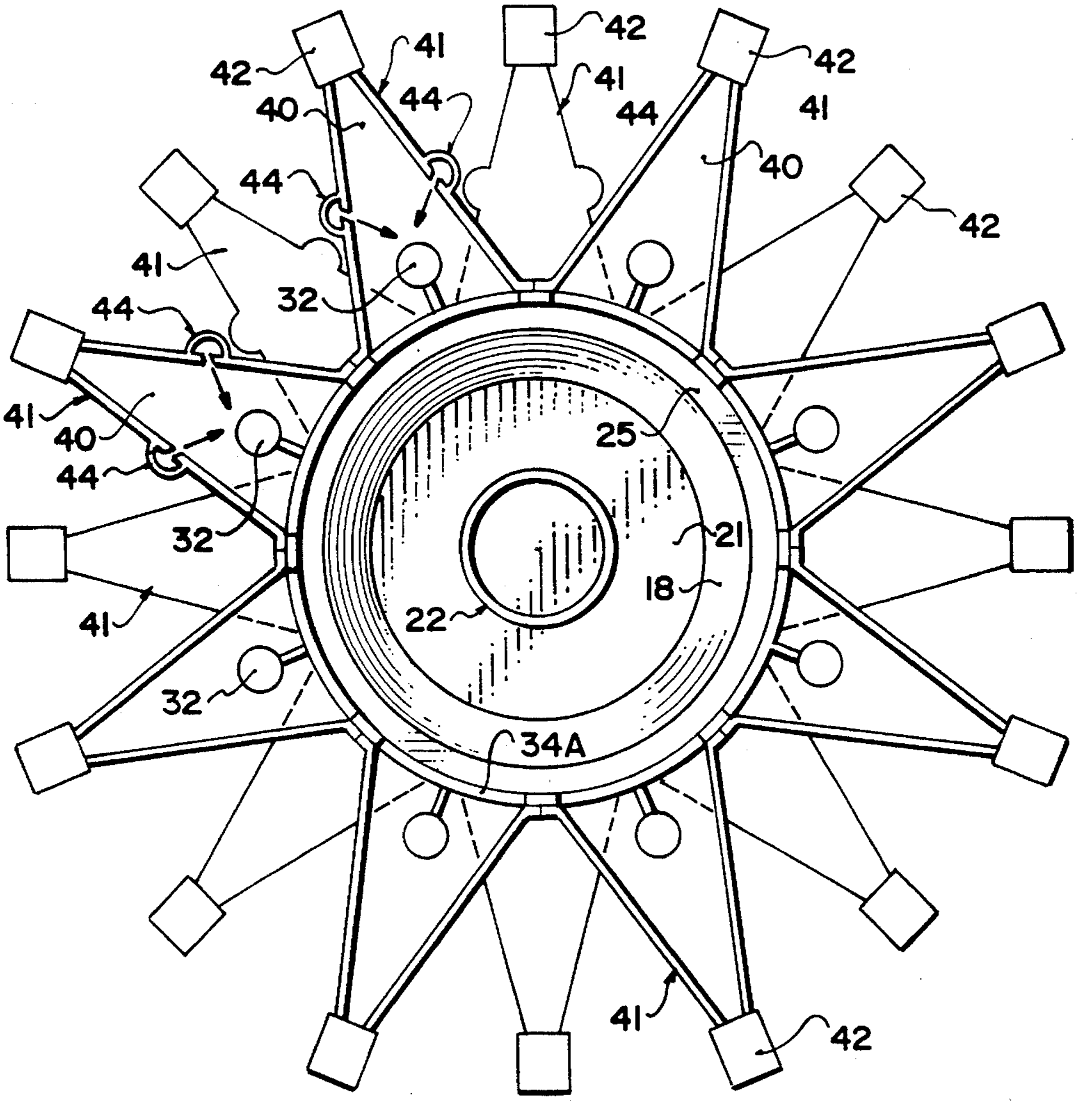
FIG. 4 is a cross sectional view along the lines 4—4 of FIG. 3.

Turning now to FIGS. 3 and 4, there is shown a modified arrangement which operates in a similar manner to that of FIGS. 1 and 2. The embodiment of FIGS. 3 and 4 is however modified in that the two recesses indicated at 40, instead of being annular recesses surrounding the full periphery of the bowl are instead formed as a plurality of conical hoppers indicated at 41. Each hopper has a pinch valve 42 at its apex and diverges from the apex in a cone shape which converts from a cone of circular base gradually to a cone of rectangular base at the ring 34A. The rectangular bases of the cones are shown in FIG. 3 with a rectangular base having a height of the order of 4 inches as previously described and a width equal to the circumference of the bowl at the ring 34A divided by the number of hoppers. In the embodiment shown there are 8 hoppers for each recess. As shown in FIG. 4 the hoppers of the upper recess are angularly offset from the hoppers of the lower recess so that material flowing over the inner surface 35 tends to pass over one or other of the recesses.

The hoppers therefore are shaped generally to follow the conical discharge volume.

Also in FIGS. 3 and 4 the arrangement is modified in that the hoppers are fluidized by the injection of liquid through the wall of the hopper rather than through the apex of the hopper. In this arrangement, therefore, the fluidization is effected by a pipe 44 mounted on each hopper at a position part way therealong with that pipe communicating with openings 45 through the wall of the hopper for injecting water into the interior of the hopper. Preferably the holes 45 are arranged to inject water so that it tends to swirl within the hopper to assist in fluidization. Preferably the holes are arranged so as to inject the water generally toward the guide body 32 so as to assist in fluidizing the material around the sides of the guide body. It will be appreciated that the guide body provides a space around its full periphery so that a cross section of the hopper taken at right angles to the axis of the hopper through the guide body provides an annular space surrounding the guide body through which the material can pass in its fluidized condition. The fluidization of the material within the hopper prevents the material from wedging in the hopper so that there is a reduced requirement to operate the pinch valve with a high frequency since the material is less prone to drying which would otherwise cause wedging in the hopper.

Figure 5:
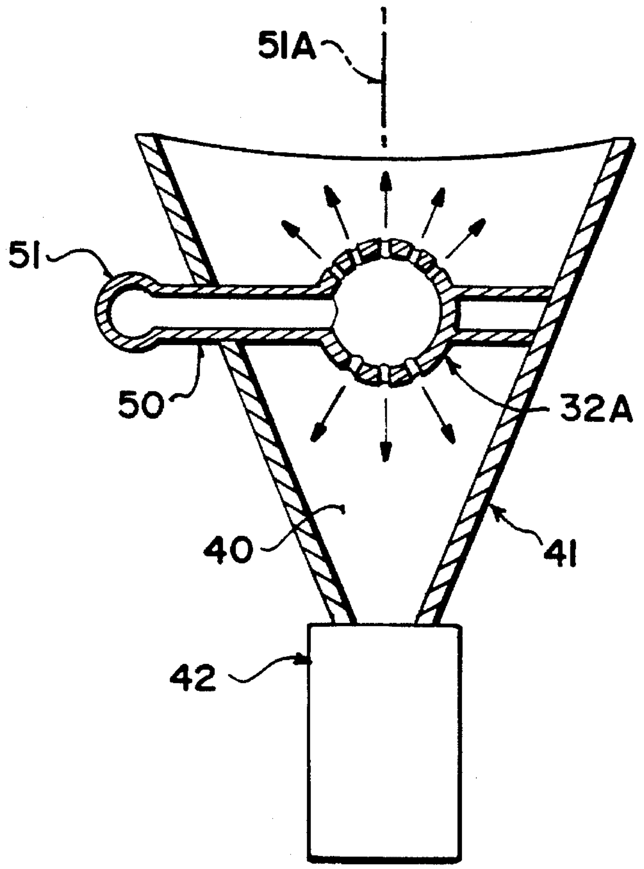
FIG. 5 is a cross sectional view through one hopper of FIG. 3 modified to provide an alternative form of fluidization for the hopper.
Figure 6:
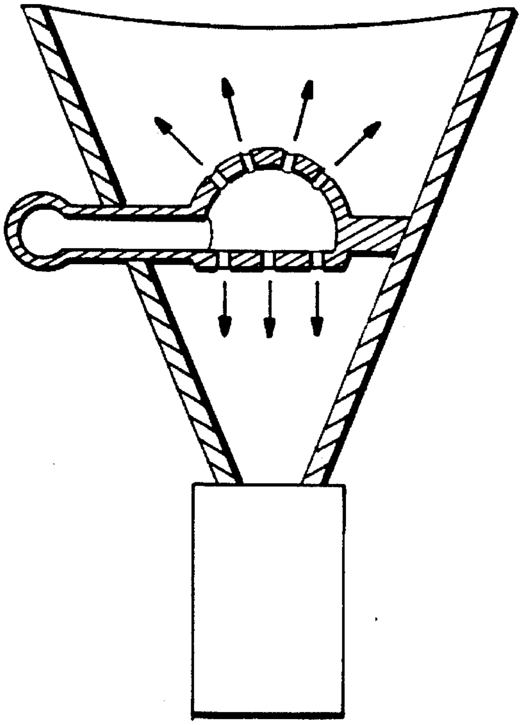
FIG. 6 is a second cross sectional view similar to that of FIG. 5 showing a yet further modified arrangement.

Turning now to FIGS. 5 and 6, there is shown a further modified arrangement in which the fluidization water is injected through the interior of the guide body 32A. In this arrangement the guide body is hollow and connect with a hollow shaft extending at right angles to the axis 51 of the conical hopper. The hollow shaft 50 is connected with a supply duct 51 connected to each of the hoppers. The water therefore passes from the supply duct 51 through the wall of the hopper within the hollow duct 50 to enter the interior of the hollow spherical guide body 32A for injection through openings in the hollow guide body to fluidize the material within the hopper.

In FIG. 6 is shown a similar arrangement in which the guide body of a different shape. In this arrangement the guide body is one half of a sphere with the curved surface projecting away from the discharge port and the flat side of this sphere toward the discharge port. Liquid can be injected through both surfaces to provide fluidization within the full interior of the hopper. Also other shapes of the guide body are possible including diamond shapes with the apex of the diamond lying on the axis 51. Yet further shapes can include the disc lying in a plane at right angles to the axis 51 or a doughnut again lying in a plane at right angles to the axis 51. In each case the body is fed by a hollow pipe so that the injection water passes through the guide body to fluidize the materials within the hopper.

Figure 7:
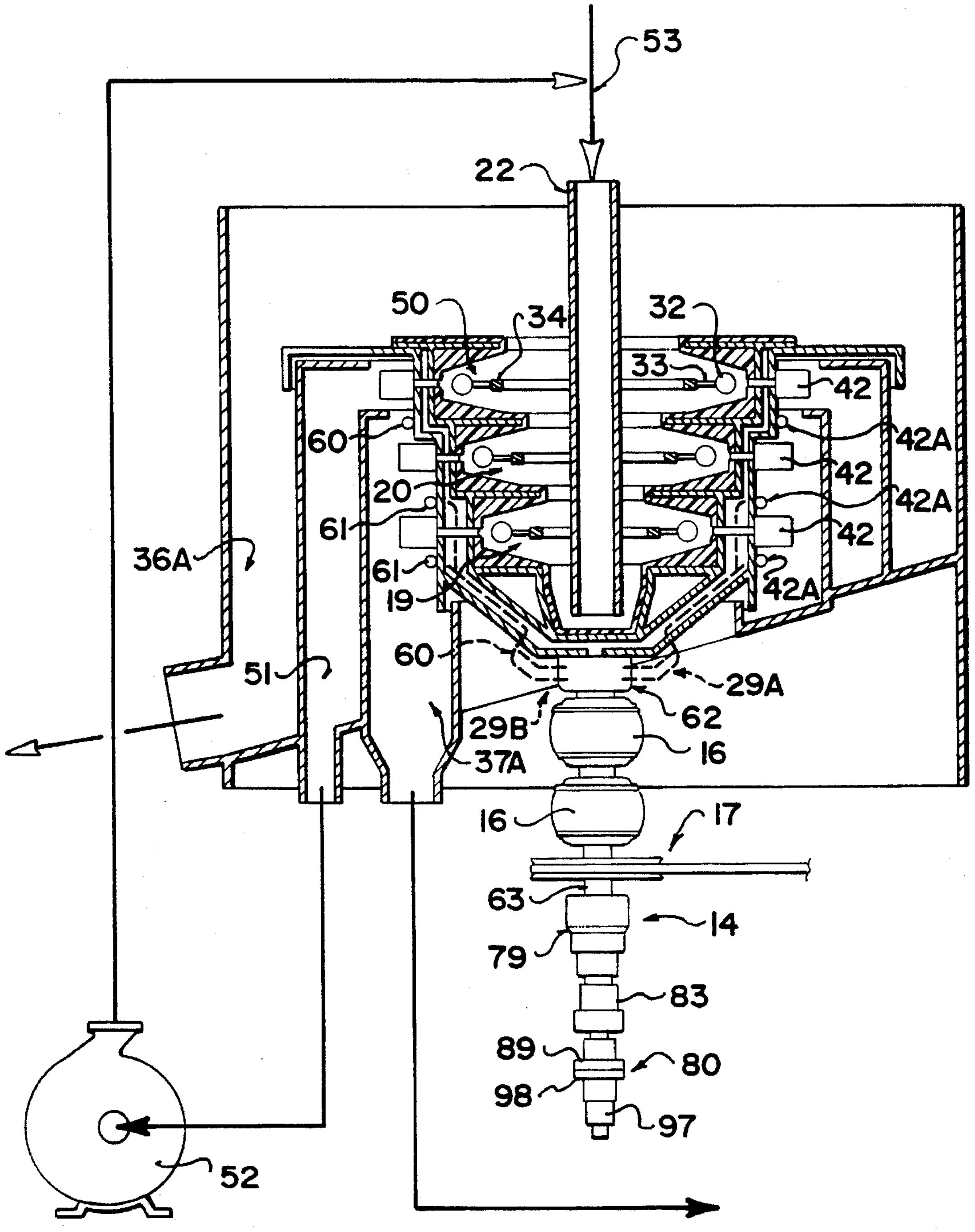
FIG. 7 is a vertical cross-section similar to that of FIG. 1 showing some modifications and additions.

Turning now to FIG. 7, this is modified relative to the cross section shown in FIG. 1 to show further detail of the construction of the housing and launders 36A and the shaft 14. Further, the cross section is modified to show further details of the ducts 29A supplying control air to the pinch valves 42. Thus each row of pinch valves includes a supply duct 42A which communicates actuating air to the respective row of pinch valves and that duct 42A is supplied through the supply ducts 29A from a manifold arrangement 29B provided at the shaft 14.

The arrangement in FIG. 7 is yet further modified by the addition of a third recess 50 downstream of the recesses 19 and 20. The third recess 50 is substantially identical to the first two recesses and is of a slightly increased diameter matching the increase in diameter between the recesses 19 and 20.

As previously described, the material discharged from the recesses 19 and 20 is collected in a launder 37A and the tailings materials discharged over the mouth of the bowl is collected in the launder 36A. In the embodiment shown in FIG. 7 an additional launder 51 is provided which collects the material solely from the recess 50 and supplies this material to a pump 52 which returns the material to the feed 53 entering the feed duct 22.

In this way the third concentrating ring or recess 50 is provided as a scavenger ring. The contents of this ring is continuously discharged through the pinch valves into the launder 51 and is from that launder pumped back into the feed inlet of the machine. The concentrate grade of the scavenger ring is not adequate to discharge into the concentrate stream from the launder 37A but contains some values worth recovering. Thus recirculating the discharge from the recess 50 into the in feed of the machine will move the values from the scavenger ring into one of the two lower rings for later discharge as concentrate.

A yet further modification shown in FIG. 7 relates to the mounting of the support ring 34 which, instead of being mounted by axially extending support elements 38 is instead supported by radially extending support elements 38A which extend from the ring radially outwardly therefrom as shown at 38A in FIG. 2 so as to hold the ring at the required position midway up the recess and centered around the central axis of the bowl. The number of support arms 38A can be selected in accordance with structural requirements but in general there will be four such support arms positioned intermediate the discharge ports and therefore intermediate the guide body 32.

Figure 8:
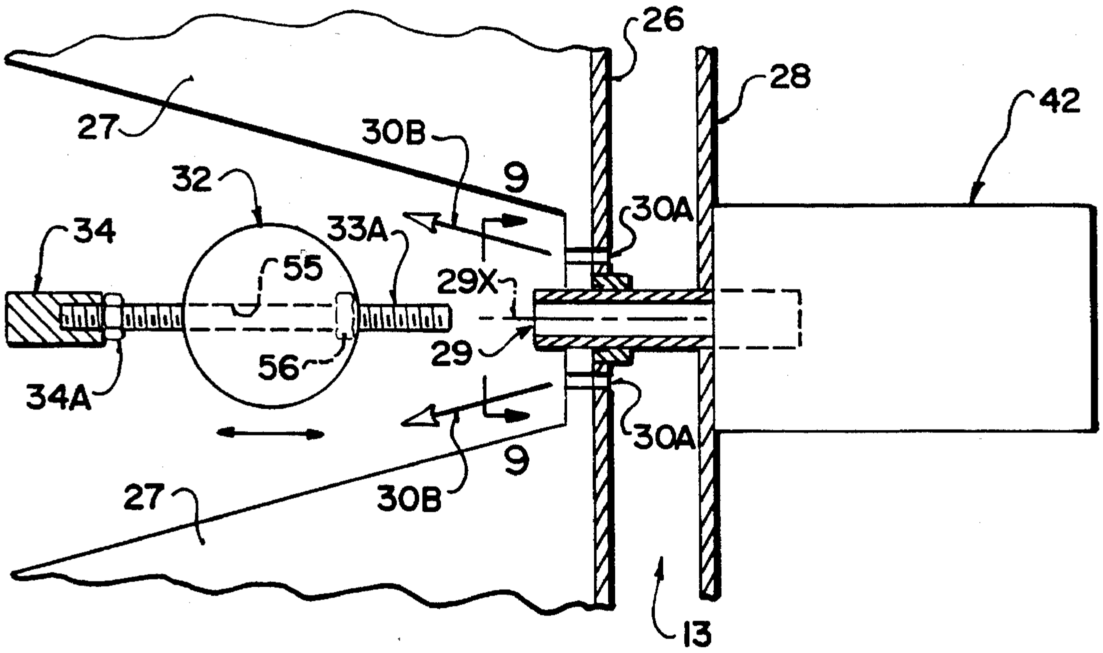
FIG. 8 is a cross-section on an enlarged scale of part only of FIG. 7 showing the mounting of the guide body on the support ring.
Figure 9:
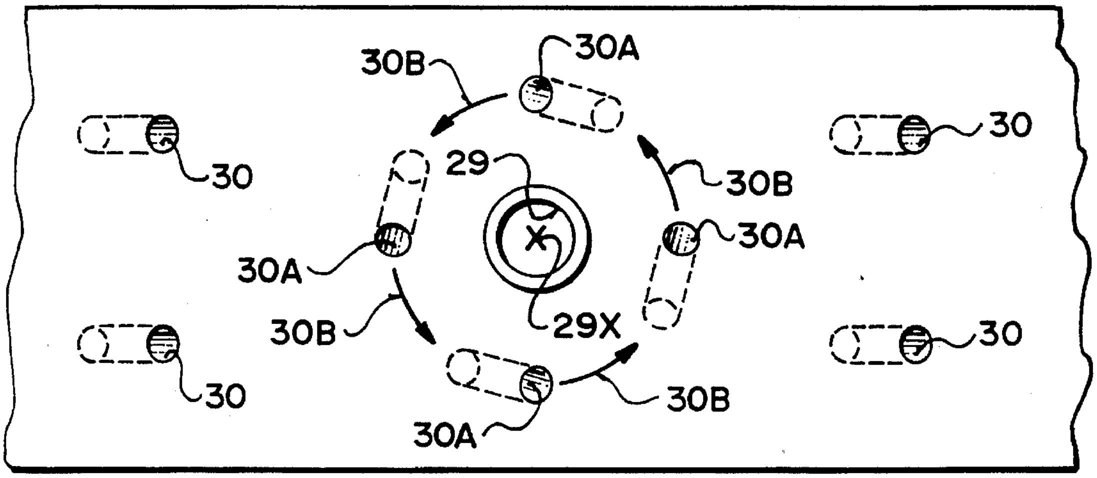
FIG. 9 is a cross-sectional view along the lines 9—9 of FIG. 8.

Turning now to FIGS. 8 and 9, two further modifications are shown. Firstly the guide body 32 has a threaded bore 55 through which support arm 33A passes which has a male thread for cooperation with the threaded bore 55. This allows adjustment of the position of the guide body 32 relative to the support ring 34 by rotation of the guide body on the threaded rod 33A. A lock nut 56 can be used to lock the guide body at the required spacing from the discharge port 29. In this way the spacing of the guide body from the discharge port can be varied in accordance with the requirements which may vary in dependence upon the type of materials to be separated including the particle size, amount of concentrate and the like. For convenience of construction, the threaded rod 33A attaches to the support ring 34 by a nut 34A attached to the ring.

In a second modification, the conventional fluid injection openings 30 are modified by the addition of further fluid injection openings 30A located at each respective discharge port 29. The openings 30A are arranged around the discharge port. The openings 30A are also formed through the base of the recess at an angle to an axis 29X radial to the bowl and extending through the discharge port. Thus the openings 30A lie on a circle surrounding the axis 29X and are inclined to the radial direction 29X and to the circle at the base of the recess so as to inject the fluidizing liquid in a direction 30B which tends to rotate around the axis 29X in a swirling motion. The openings are arranged to direct the liquid in the same direction of rotation. The direction of injection also includes a component which extends from the base of the recess toward the central axis of the bowl as shown in FIG. 8 so that the liquid tends to swirl around the axis 29X while moving toward the center of the bowl thus forming to some extent a vortex surrounding the guide body 32. This assists in fluidizing the material and extending the influence of the discharge port over a wider area to intersect at the inner surface as shown in FIG. 2.

Figure 10:
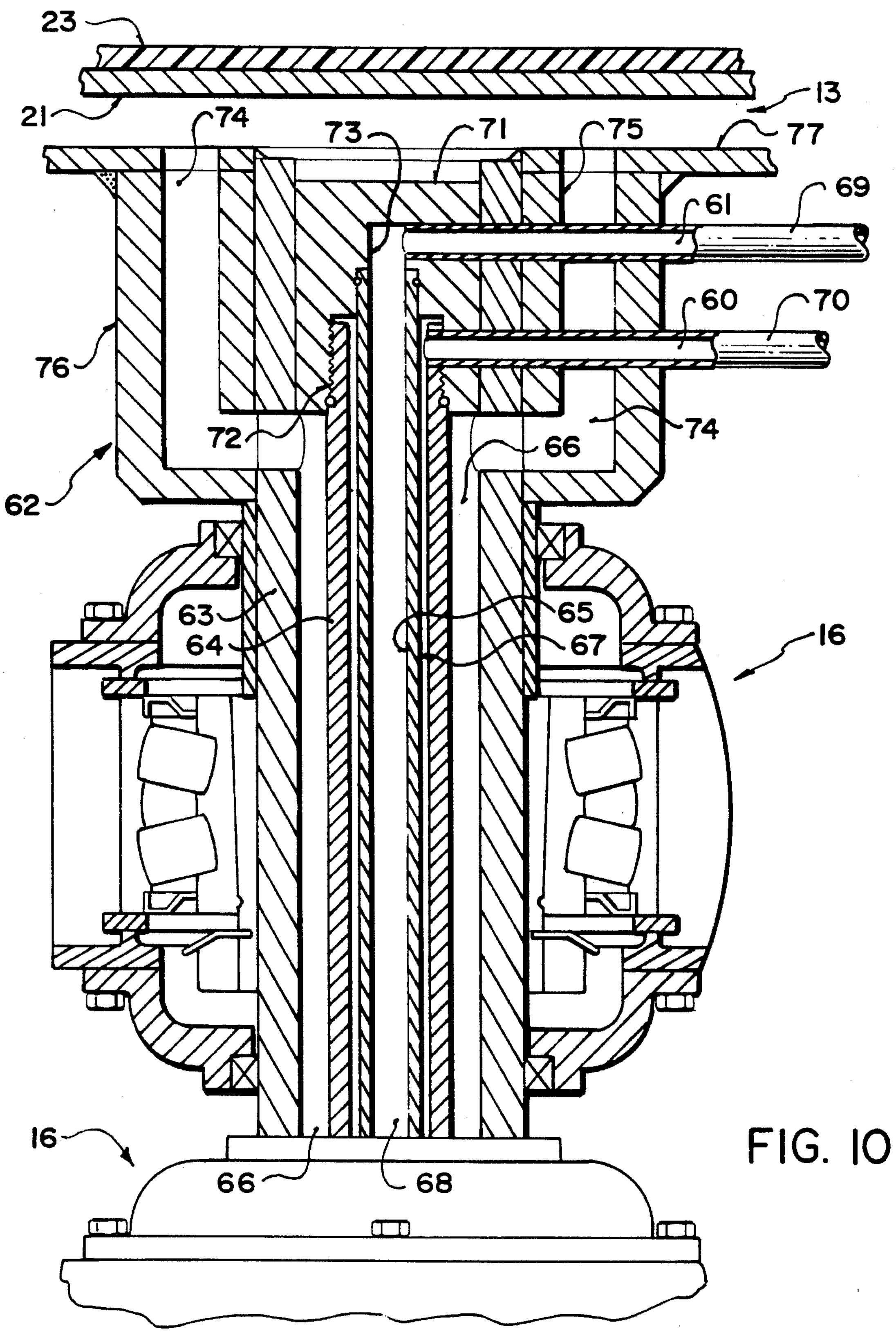
FIG. 10 is an enlarged view of one part only of FIG. 7.
Figure 11:
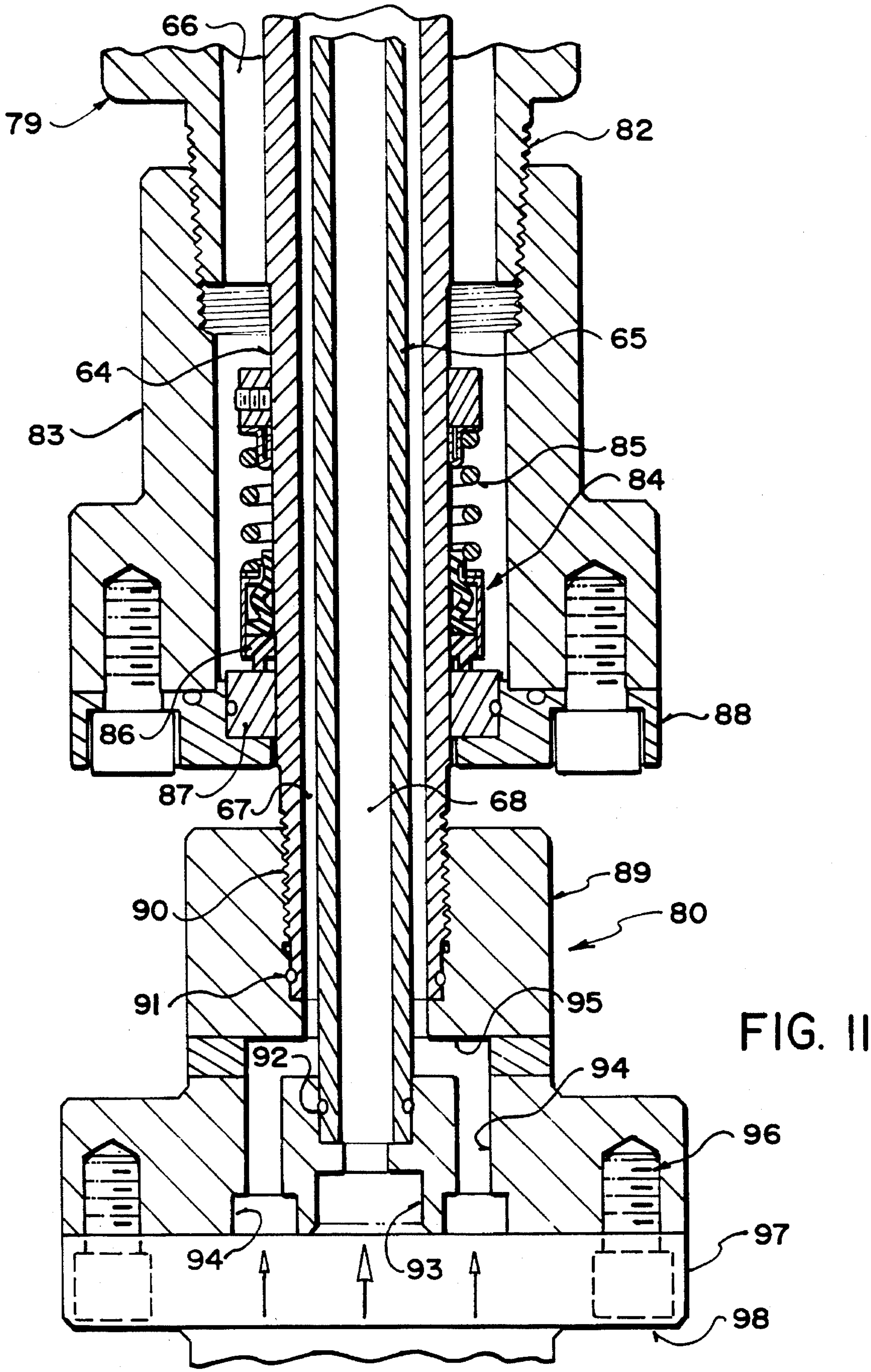
FIG. 11 is an enlarged view of another part only of FIG. 7

Turning now to FIGS. 7, 10 and 11, the details of the control system to the valves 42 are shown. Thus the valves 42 of the channel 50 are controlled commonly by a fluid supply duct 60 which is separate from the fluid supply duct 61 of the channels 19 and 20. This allows the valves 42 of the channel 50 to be operated in a pulsed manner with a rate of the pulses greater than that of the valves of the channels 19 and 20 so as to pull off an increased amount of material.

Thus the total period that the valves are open for the channel 50 is greater than the total period that the valves open for the channels 19 and 20 to provide an increase in the amount of material discharged. In some circumstances this can be obtained not by increasing the rate of the pulses but by increasing the period of the pulses.

The pulsing of the valves of course acts to discharge the material in sequential portions. All of the valves of a respective one of the channels are open simultaneously by the provision of fluid pulses in the respective supply duct 60, 61.

In FIG. 10, the connection of the supply ducts 60 and 61 to a hub 62 of the shaft is shown.

The shaft is thus formed by three concentric tubes 63, 64 and 65. Between the tubes 63 and 64 is provided a first annular duct 66. Between the tubes 65 and 64 is provided a second annular duct 67 and inside the innermost tube 65 is provided a third duct 68. The duct 61 is connected to the duct 68 by one or more radially extending pipes 69 which extend radially through the hub 62. Similarly the duct 67 is connected to the duct 60 by a plurality of radially extending pipes 70 which are axially offset from the pipes 69. Thus the pipes 69 connect with the duct 68 at the very end of the duct. The duct 68 terminates at a position spaced axially from the end of the tube 65 since the tube 64 ends at a position spaced axially from the end of the tube 65. The hub 62 includes a block 71 which has a threaded bore 72 receiving an end of the tube 64. The block 71 further includes a counter bore 73 into which the tube 65 extends with the counterbore providing an end part of the duct 68 which connects with the ducts 69. The block 71 is received in an end of the tube 63 and acts to close the end of the tube 63. At the lower end of the block 71 is provided a plurality of ducts 74 which extend radially outwardly from connection with the annular duct 66 within the tube 63.

The hub 62 further includes a sleeve 75 and an outer sleeve 76. The sleeve 75 is directly connected around the outside of the tube 63. The sleeve 76 is spaced outwardly and defines an annular channel connected with the ducts 74 and extending therefrom to an opening in a base wall 77 of the outer bowl or jacket. Water supplied through the duct 66 of the shaft thus passes outwardly through the radial duct 74 and through the annular channel between the sleeve 75 and 76 to and through the base 77 for fluidizing the bowl as previously described.

The tube 63 defines the outer most surface of the shaft which is carried in the bearings 16 as previously described. The tube 63 projects through the lowermost bearing 16 and into engagement with the pulley 17 and terminates at the pulley 17. The tube 63 has threaded into it at its lower end a rotary union 79 for injecting water through the rotary union into the rotating shaft defined by the tube 63. The rotary union is a commercially available item conventionally used on rotary elements of this type for injecting a fluid into the rotating shaft. In this case the tubes 64 and 65 extend through the rotary union 79 for connection to a second rotary union 80 for supply of fluid to the ducts 67 and 68. The rotary union 79 includes a male thread 82 at its lower end onto which is attached a cap 83 which closes the lower end of the rotary union for sealing the lower end and preventing the escape of water from the lower end of the rotary union. The cap 83 includes a spring biased seal 84 biased downwardly by the spring 85 to provide engagement of sealing member 86 against a sealing washer 87 at a lower end of the cap 83. The washer 87 is held in place by a bolted end plate 88 screw fastened to the body of the cap 83.

The tubes 63, 64 and 65 forming the shaft all rotate commonly with the hub 62 in driving rotation of the bowl. The rotary union 79 is stationary so that the tube 63 rotates within the stationary rotary union.

The second rotary union 80 includes a cap portion 89 which is attached to the lower ends of the tubes 64 and 65 for rotation therewith. Thus the cap portion 89 includes a female screw thread 90 receiving a male thread of the tube 64 therein. Seals 91 and 92 prevent the escape of fluid to the outside of the tubes 64 and 65 respectively. The cap 89 includes a central duct 93 communicating with the duct 68. The cap further includes a plurality of ducts 94 arranged at radially spaced positions around the central duct 93 and communicating with a counter bore section 95 within the end cap 89 communicating with the duct 67. The end cap 89 is bolted by bolts 96 to the lower part of the rotary union indicated at 97. The lower part of the rotary union 80 is a commercially available item having an upper cap portion 98 which rotates with the cap 89 and a lower portion which remains stationary and is connected to suitable supply ducts (not shown) for communicating the fluid into the ducts 93 and 94.

The single shaft as shown, therefore, provides the communication of the fluidizing water around the outer most one of the annular channels together with communication of control fluid through the central circular channel and through the inner annular channel. If required, a yet further tube can be provided in the construction of the shaft so as to provide four ducts coaxially arranged each inside the next. Such four ducts are then used to provide the fluidizing liquid and to provide three sets of control fluid each for controlling a respective one of the valves sets of the channels 19, 20 and 50. This arrangement allows each of the channels to be individually tailored in regard to its discharge characteristics to the amount of concentrate collecting in that particular channel.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A method of separating intermixed materials of different specific gravity comprising:

providing a centrifuge bowl having a peripheral wall and an open mouth;

rotating the bowl about a longitudinal axis so as to rotate the peripheral wall around the axis;

providing a feed material and feeding the feed material to the bowl so as to pass over the peripheral wall and to cause heavier materials to collect on the peripheral wall with a remainder of the feed material escaping from the bowl through the open mouth;

defining on the peripheral wall at least one first axially localized annular recess extending radially outwardly of the peripheral wall for collecting the heavier materials;

defining on the peripheral wall at least one second axially localized annular recess extending radially outwardly of the peripheral wall for collecting the heavier materials, the second recess being downstream of the first recess;

providing at the first and second recesses first and second discharge means each at an outer surface of the respective recess, each for allowing materials collecting in the area to discharge outwardly from the peripheral wall under centrifugal forces generated by rotation of the bowl;

providing each of the first and second discharge means with valve means for controlling discharge of the materials from the recesses;

collecting the outwardly discharged materials from the first and second recesses;

and providing first and second control means for separately controlling the valve means of the first and second recesses respectively so as to provide for each of said first and second recesses different discharge characteristics.

2. The method according to claim 1 including providing as the discharge means a plurality of discharge ports and providing for each discharge port a respective valve anti including locating the respective valve outwardly of the discharge port such that the discharge port is free from obstruction to the collecting materials.

3. The method according to claim 1 including providing each of the first and second discharge means as a plurality of angularly spaced discharge ports and for each discharge port providing a separate valve of said valve means.

4. The method according to claim 3 including pulsing each valve so as to open and close the valve repeatedly to discharge the material in sequential portions.

5. The method according to claim 4 including causing the control means of each recess to control all of the valves of that recess simultaneously.

6. The method according to claim 4 including causing the control means of each recess to control the valves to provide a total period that the valves are open such that the total period for the second recess is greater than the total period of the first recess so as to discharge a greater volume of material.

7. The method according to claim 6 including causing the control means to provide an increased rate of pulsing for the second recess relative to that of the first recess.

8. The method according to claim 4 including providing the valves as fluid operated pinch valves.

9. The method according to claim 8 including providing for the valves of the first recess a different fluid supply circuit from that of the second recess.

10. The method according to claim 9 including providing the bowl with a support shaft and providing each of the fluid supply circuits with a portion thereof extending along the shaft.

11. The method according to claim 10 including providing the fluid supply circuits with coaxially arranged duct portions extending along the shaft and supplying each duct portion with fluid from a separate stationary swivel coupling mounted on the shaft.

12. The method according to claim 11 including mounting the swivel couplings at axially spaced positions along said shaft.

13. The method according to claim 12 including providing a first of the duct portions as a central tube of the shaft and providing a second of the duct portions as a sleeve coaxially surrounding the central tube.

14. The method according to claim 13 including supplying fluidizing liquid to the bowl through the peripheral wall and supplying the fluidizing liquid through a duct portion surrounding the first and second duct portions of the fluid circuits.

* * * * *